(12) United States Patent
Dautenhahn (10) Patent No.: US 7,708,183 B2
(45) Date of Patent: May 4, 2010

(54) REFLOW SOLDER OVEN WITH COOLING DIFFUSER

(75) Inventor: Jonathan M. Dautenhahn, Linn Creek, MO (US)

(73) Assignee: Illinois Tool Works Inc., Glenview, IL (US)

( * ) Notice: Subject to any disclaimer, the term of this patent is extended or adjusted under 35 U.S.C. 154(b) by 43 days.

(21) Appl. No.: 12/057,876

(22) Filed: Mar. 28, 2008

(65) Prior Publication Data

US 2009/0242616 A1    Oct. 1, 2009

(51) Int. Cl.
*B23K 1/00* (2006.01)
*F27D 15/02* (2006.01)
*F27B 9/02* (2006.01)

(52) U.S. Cl. .................. 228/46; 228/42; 228/200; 228/222; 432/80; 432/128

(58) Field of Classification Search ............... 228/7–9, 228/41–43, 46, 49.5, 179.1–180.22, 199–200; 219/632, 677, 757
See application file for complete search history.

(56) References Cited

U.S. PATENT DOCUMENTS

| | | | |
|---|---|---|---|
| 4,557,203 A | 12/1985 | Mainord | |
| 5,338,008 A | 8/1994 | Okuno et al. | |
| 5,524,812 A | 6/1996 | Taniguchi et al. | |
| 5,611,476 A | 3/1997 | Soderlund et al. | |
| 5,641,341 A * | 6/1997 | Heller et al. | ................. 95/287 |
| 5,993,500 A | 11/1999 | Bailey et al. | |
| 6,120,585 A | 9/2000 | Inomata et al. | |
| 6,146,448 A | 11/2000 | Shaw et al. | |
| 6,193,774 B1 | 2/2001 | Durdag et al. | |
| 6,354,481 B1 | 3/2002 | Rich et al. | |
| 6,386,422 B1 * | 5/2002 | Cheng et al. | .................. 228/46 |
| 6,446,855 B1 | 9/2002 | Rich | |
| 6,694,637 B2 | 2/2004 | Miller, Jr. et al. | |
| 6,749,655 B2 | 6/2004 | Dautenhahn | |
| 2001/0055740 A1 | 12/2001 | Bloom et al. | |
| 2003/0136020 A1 | 7/2003 | Miller, Jr. et al. | |

FOREIGN PATENT DOCUMENTS

EP        0802010       10/1997
WO    WO 2005/065876    7/2005

OTHER PUBLICATIONS

International Search Report and Written Opinion; Mailed Jun. 25, 2009; PCT US2009/033611.

* cited by examiner

*Primary Examiner*—Jessica L. Ward
*Assistant Examiner*—Kevin E Yoon
(74) *Attorney, Agent, or Firm*—Thompson Hine LLP (57) ABSTRACT

A diffuser plate for a reflow oven includes an upper surface and a plurality of nozzle openings therein. Each of the plurality of nozzle openings has a raised surrounding portion for restricting condensed flux on the upper surface of the diffuser plate from flowing through the nozzles. A drain hole permits condensed flux on the upper surface to flow downward through the plate.

6 Claims, 7 Drawing Sheets

REFLOW SOLDER OVEN WITH COOLING DIFFUSER

TECHNICAL FIELD

This application relates generally to a reflow solder oven and, more particularly, to a reflow solder oven with cooling diffuser.

BACKGROUND

Reflow soldering ovens are used in the production of printed circuit boards employing surface mount technology. Typically, in a reflow soldering oven, the products to be soldered pass through heating zones to a cooling zone. The heating zones are separated into a number of different zones which are generally broken down into preheat zones, soak zones and spike zones. In the preheat zones and the soak zones, the products are heated and the flux volatile components vaporize in the surrounding gas atmosphere. The spike zones are hotter than the preheat zones and soak zones, and it is in the spike zones that the solder melts. A reflow solder oven may have many heating zones and these heating zones can be varied depending on the products to be soldered. Different products require different heat profiles and a solder oven should be flexible so that, for example, a machine with ten heating zones may have one preheat zone followed by seven soak zones and two spike zones for one type of circuit board, and a machine may have three preheat zones, six soak zones and one spike zone for a different type of board. The cooling zone or zones follow the heating zones and are used to solidify the solder on the board.

During production, a paste containing solder particles mixed with flux, adhesives, binders, and other components is applied to selected areas of a printed circuit board. Electronic components are pressed against the applied solder paste, while adhesives in the paste hold the components to the printed circuit board. A conveyor belt within a reflow oven carries the printed circuit board and components through a high temperature region within the oven where they are heated to a temperature sufficient to cause the solder particles in the paste to melt. Molten solder wets metal contacts on the components and printed circuit board. The flux in the solder paste reacts with the contacts to remove oxides and to enhance wetting. The conveyor belt moves the heated printed circuit board to a cooling region of the oven where the molten solder solidifies forming a completed electronic circuit.

The reaction of the flux with the contacts liberates vapors. Further, heat within the oven vaporizes un-reacted flux as well as the adhesives, binders, and other components of the solder paste. If the vapors migrate to the cooling region, they can undesirably condense on the circuit boards. The vapors may also condense on cooler surfaces within the oven.

The vapors generated by the reflow operation collectively are referred to herein as "flux vapors." It is understood that the flux vapors can include vaporized flux, vapors from other components of the solder paste, reaction products released when the flux is heated, as well as vapors out-gassed from the printed circuit board and electronic components.

It is therefore desirable to provide a flux management system that removes flux from the system while preventing or minimizing flux from dripping on the printed product. It is also desirable to provide a flux management system that can be cleaned with little or minimized maintenance downtime for the associated reflow oven.

SUMMARY

In an aspect, a reflow solder oven includes a conveyor mechanism for moving printed circuit boards through at least one heating zone followed by at least one cooling zone. The cooling zone includings a gas flow path with a gas intake, a heat exchanger, a plenum and a diffuser plate. The diffuser plate is positioned downstream of the gas intake for cooling gas flowing thereby. The plenum is downstream of the heat exchanger for receiving cooled gas from the heat exchanger. The diffuser plate has an upper surface exposed to the plenum and a plurality of nozzle openings arranged to direct cooled gas from the plenum downward toward printed circuit boards on the conveyor mechanism. Each of the plurality of nozzle openings has a raised surrounding portion within the plenum that acts to restrict condensed flux on the upper surface of the diffuser plate from flowing through the nozzle openings toward printed circuit boards.

In another aspect, a diffuser plate for a reflow oven includes an upper surface and a plurality of nozzle openings therein. Each of the plurality of nozzle openings has a raised surrounding portion for restricting condensed flux on the upper surface of the diffuser plate from flowing through the nozzles. A drain hole permits condensed flux on the upper surface to flow downward through the plate.

In another aspect, a method of restricting condensed flux from collecting on printed circuit boards within a cooling zone of a reflow solder oven is provided. The method includes forming a diffuser plate by forming a plurality of nozzle openings in a piece of sheet material and forming a raised portion surrounding each nozzle opening in the sheet material. The raised portion of each nozzle opening extends outwardly from an upper surface of the sheet material such that the nozzle opening is located below an apex of the raised portion. The diffuser plate is located within the cooling zone. Cooled gas is directed onto the upper surface of the diffuser plate.

The details of one or more embodiments are set forth in the accompanying drawings and the description below. Other features, objects, and advantages will be apparent from the description and drawings, and from the claims.

DETAILED DESCRIPTION

Figure 1:
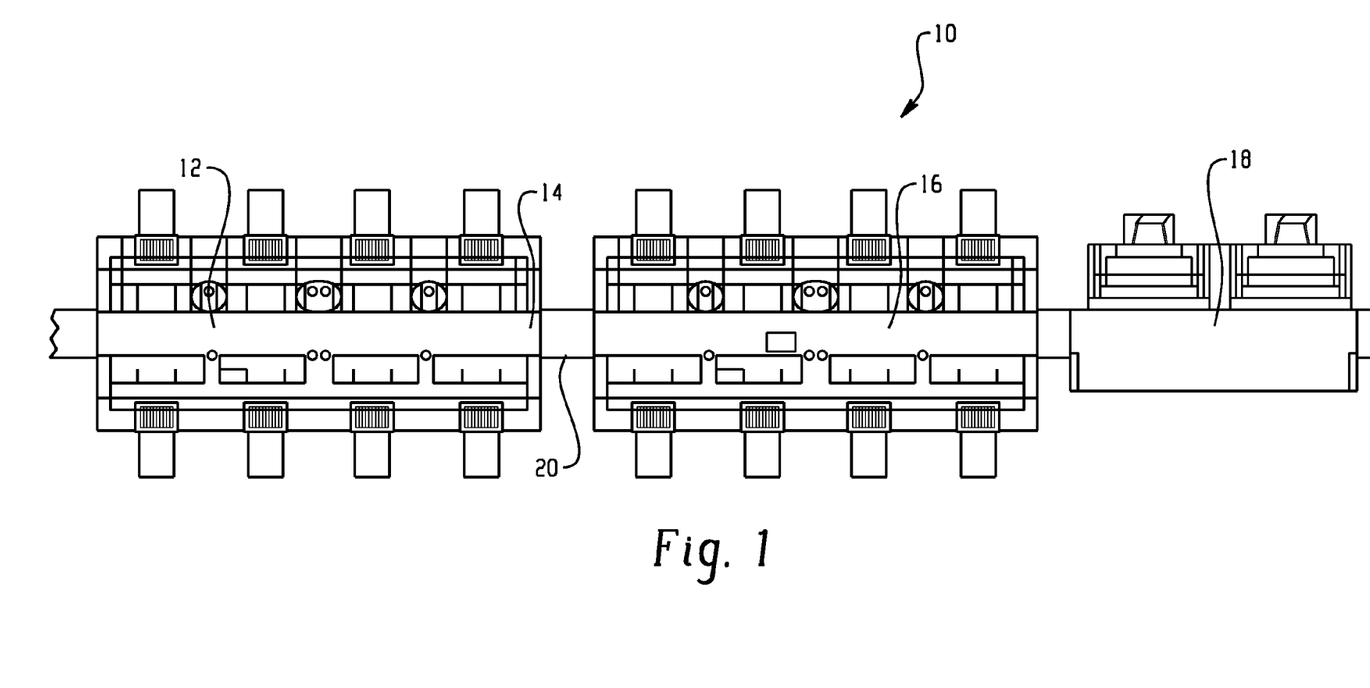
FIG. 1 is a diagrammatic, side view of an embodiment of a reflow soldering oven.

Referring to FIG. 1, a reflow soldering oven 10 includes a plurality of heating zones which includes two preheat zones 12 followed by four soak zones 14 followed by two spike zones 16. Following the spike zones 16 are cooling zones 18. Incorporated within one or more of the cooling zones 18 is a flux collection system that inhibits flux from collecting on printed circuit boards (PCBs) passing therethrough. The PCBs are carried through the oven 10 by a conveyor mechanism, represented by element 20.

Figure 2:
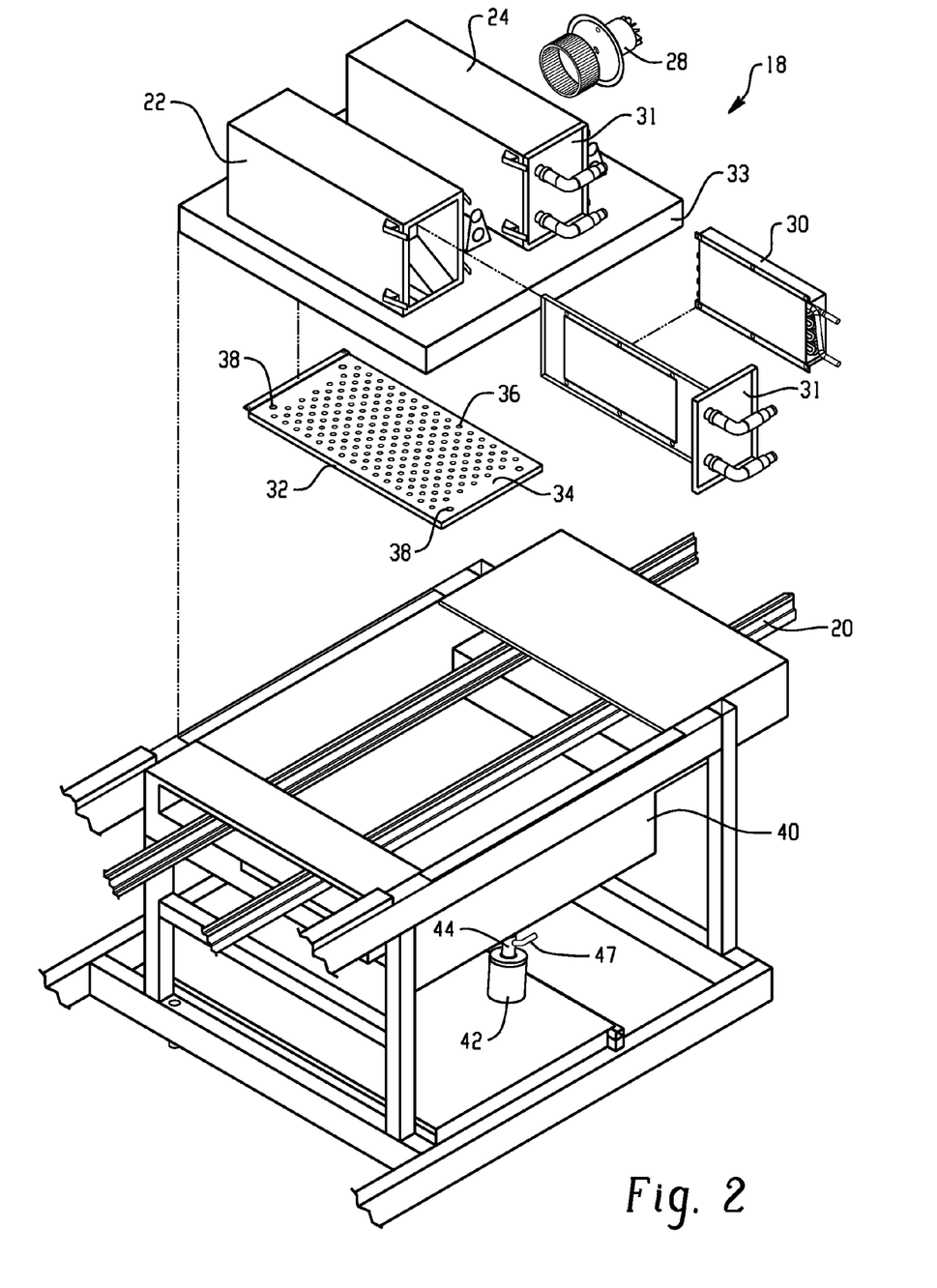
FIG. 2 is an exploded, perspective view of an embodiment of a cooling zone for use in the reflow soldering oven of FIG. 1.

Referring to FIG. 2, cooling zone 18 is used to direct cooled gas onto the PCBs after the PCBs have passed through the heating zones and as they are carried by the conveyor mechanism 20. The cooling zone 18 includes heat exchanger compartments 22 and 24, each including an intake 26 (see FIG. 9) through which air (or other gas) flows into the compartment, for example, from an upstream zone and a fan 28 that is used to move the air through the compartment. A heat exchanger 30 is provided in each compartment 22, 24. A connector frame 31 removably positions the heat exchanger in the compartments 22 and 24. The heat exchangers 30 have a coolant flowing therethrough that removes heat from the air. The air is moved through the heat exchanger 30 by the fan 28 and exits the bottom of the compartment into a plenum 33.

One or more diffuser plates 32 is located downstream of the intake 26 and heat exchangers 30. The diffuser plate 32 is positioned below the compartments 22 and 24 and has an upper surface 34 that is exposed to the plenum 33. The diffuser plate 32 includes multiple nozzle openings 36 extending therethrough. The nozzle openings 36 direct the cooled air from the plenums 22 and 24 downward toward the PCBs as they are carried by the conveyor mechanism 20. As will be described in greater detail below, the nozzle openings 36 include a feature that restricts passage of condensed flux on the upper surface 34 of the diffuser plate 32 from flowing through the nozzle openings, toward the PCBs located beneath the diffuser plate.

Located at corners of the diffuser plate 32 are drain holes 38. The drain holes 38 do not include the flux restricting features of the nozzle openings 36 so that condensed flux on the surface of the diffuser plate can flow therethrough. The drain holes 38 are located outside (or to the sides of) the conveyor mechanism 20 so that the condensed flux flowing through the drain holes falls directly into a cooling pan 40 beneath the conveyor mechanism.

A flux collection container 42 is in communication with the cooling pan 40 via a drain conduit 44. The drain conduit 44 is connected to a drain 46 (see FIG. 10) in the bottom of the cooling pan 40. The flux collection container 42 collects the condensed flux that is drained from the cooling pan 40. A quick disconnect mechanism 47 can be used to easily disconnect the collection container 42 from the drain conduit 44 to clean out and dispose of the flux collected in the collection container.

Figure 3:
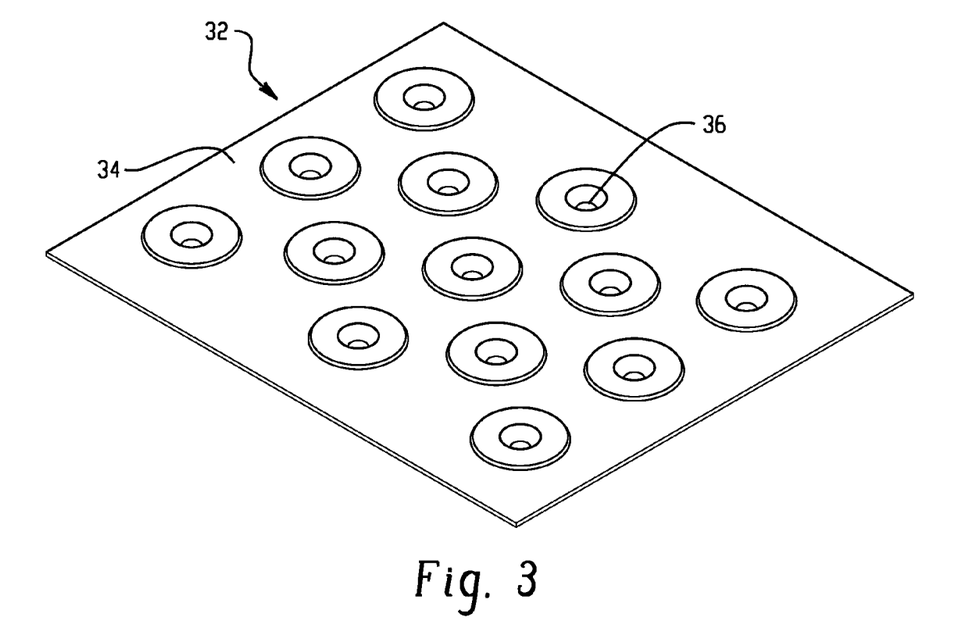
FIG. 3 is a perspective, partial view of an embodiment of a diffuser plate for use in the cooling zone of FIG. 2.

FIG. 3 illustrates a portion of the diffuser plate 32 showing the upper surface 34 and nozzle openings 36. A raised portion 48 surrounds the nozzle openings 36. Each raised portion 48 is in the form of an annular ring integrally formed with and protruding upwardly from the upper surface 34 of the diffuser plate 32.

Figure 4:
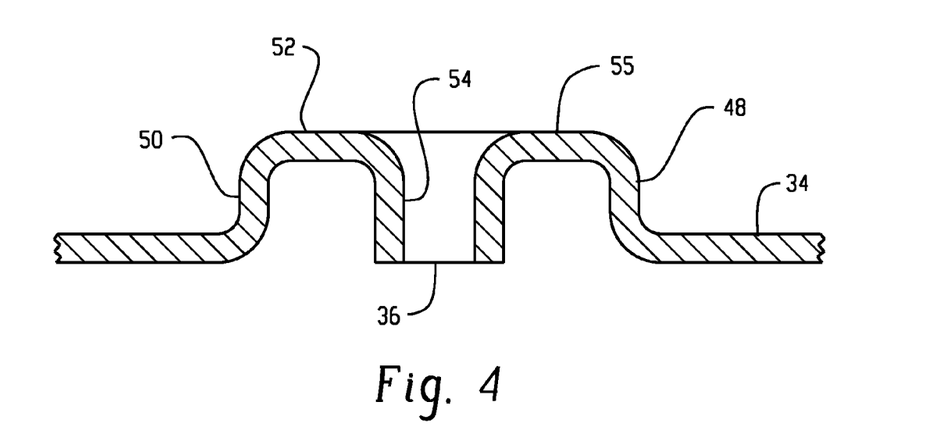
FIG. 4 is a side, section view of an embodiment of a nozzle opening with raised portion of the diffuser plate of FIG. 3.

Referring to FIG. 4, a section view of the nozzle opening 36 illustrates the raised portion 48 extending upwardly from the upper surface 34 of the diffuser plate 32. The raised portion 48 provides a barrier or wall 50 restricting flow of condensed flux thereby and toward the nozzle opening 36. While a variety of configurations are possible, the wall 50 rises upwardly from the upper surface 34 and levels off to a horizontal portion 52 extending radially inwardly to a downwardly extending portion 54 which ends at the nozzle opening 36. As can be seen, the nozzle opening 36 is located below an apex 55 of the raised portion 48.

Figure 5:
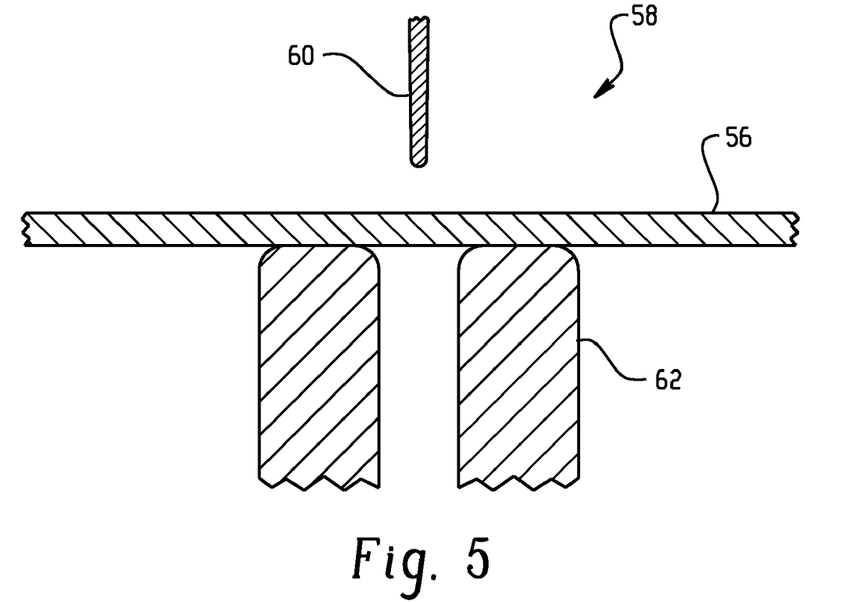
FIGS. 5-8 illustrate, diagrammatically, an embodiment of a process for forming the nozzle opening with raised portion of FIG. 4.
Figure 6:
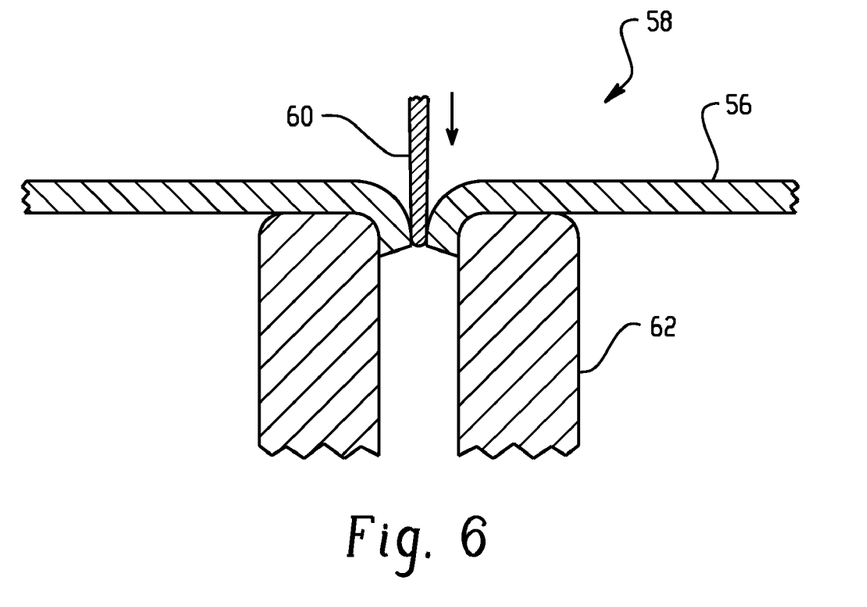
Figure 7:
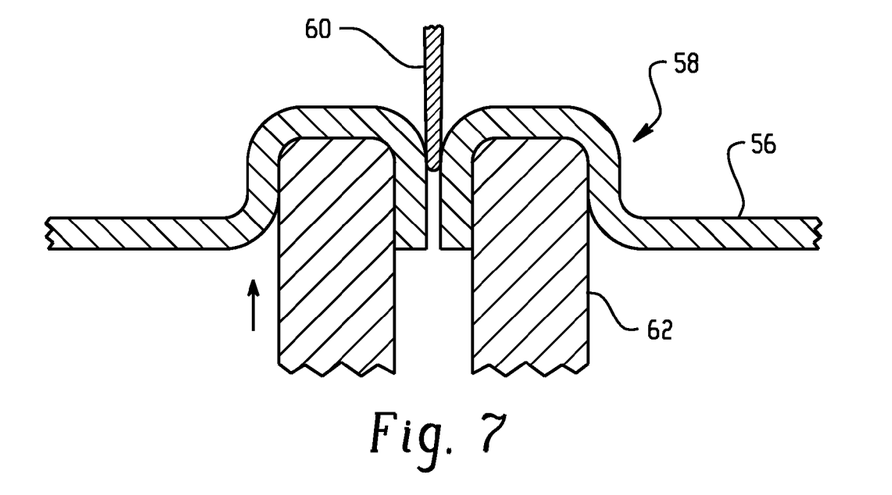
Figure 8:
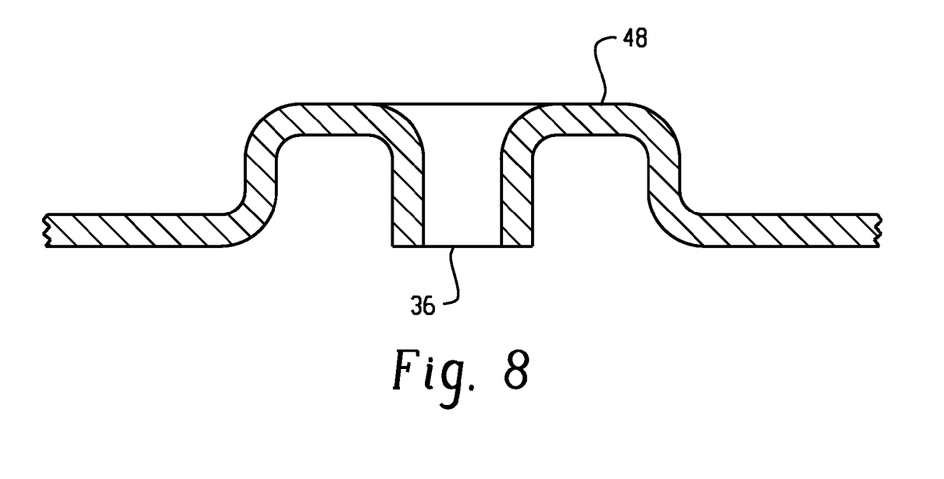

FIGS. 5-8 illustrate, diagrammatically, a forming process for forming the nozzle openings 36 with raised portions 48 surrounding the nozzle opening. Referring to FIG. 5, a piece of sheet metal 56 is located on a stamping press, generally referred to as element 58. Any suitable material may be used for the sheet metal 56 such as various forms of carbon steel, stainless steel, aluminum, copper, and titanium. The sheet metal 56 is positioned below a punch 60. While a number of configurations are possible, the sheet metal 56 is also positioned above forming tool 62, which can also serve as a die for a punching operation. Referring to FIG. 6, the punch 60 is extended to pierce the sheet metal 56 and form a convergent nozzle opening. Referring to FIG. 7, then the forming tool 62 is extended to form the raised portion 48. FIG. 8 illustrates the completed nozzle opening 36 with annular raised portion 48. In other embodiments, the punch and forming tool 60, 62 may be extended simultaneously or the forming tool may be extended first and then the punch. The stamping press 58 may be controlled electronically by a controller including logic for forming the nozzle openings 36 and raised portions. The stamping press 58 may include a positioning system for moving the tools and/or sheet metal (e.g., in an x-y plane) for forming the multiple nozzle openings 36 and raised portions 48 in the diffuser plate 32. Also, the stamping press 58 may be connected to an automatic feeder which feeds sheet material to the stamping press. Once the diffuser plate 32 is formed, it is placed in the cooling zone 18 as described above.

Figure 9:
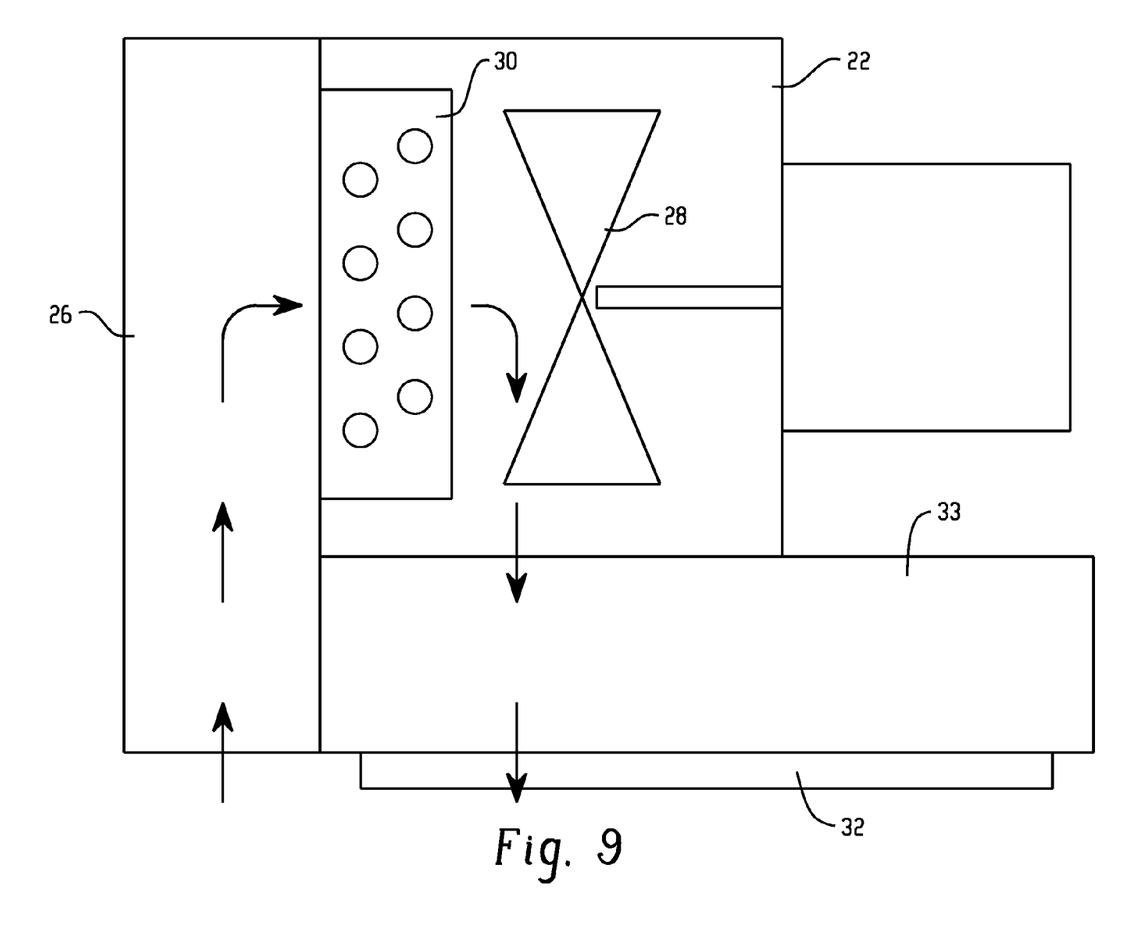
FIGS. 9 and 10 illustrate an embodiment of a process for using the cooling zone of FIG. 2.
Figure 10:
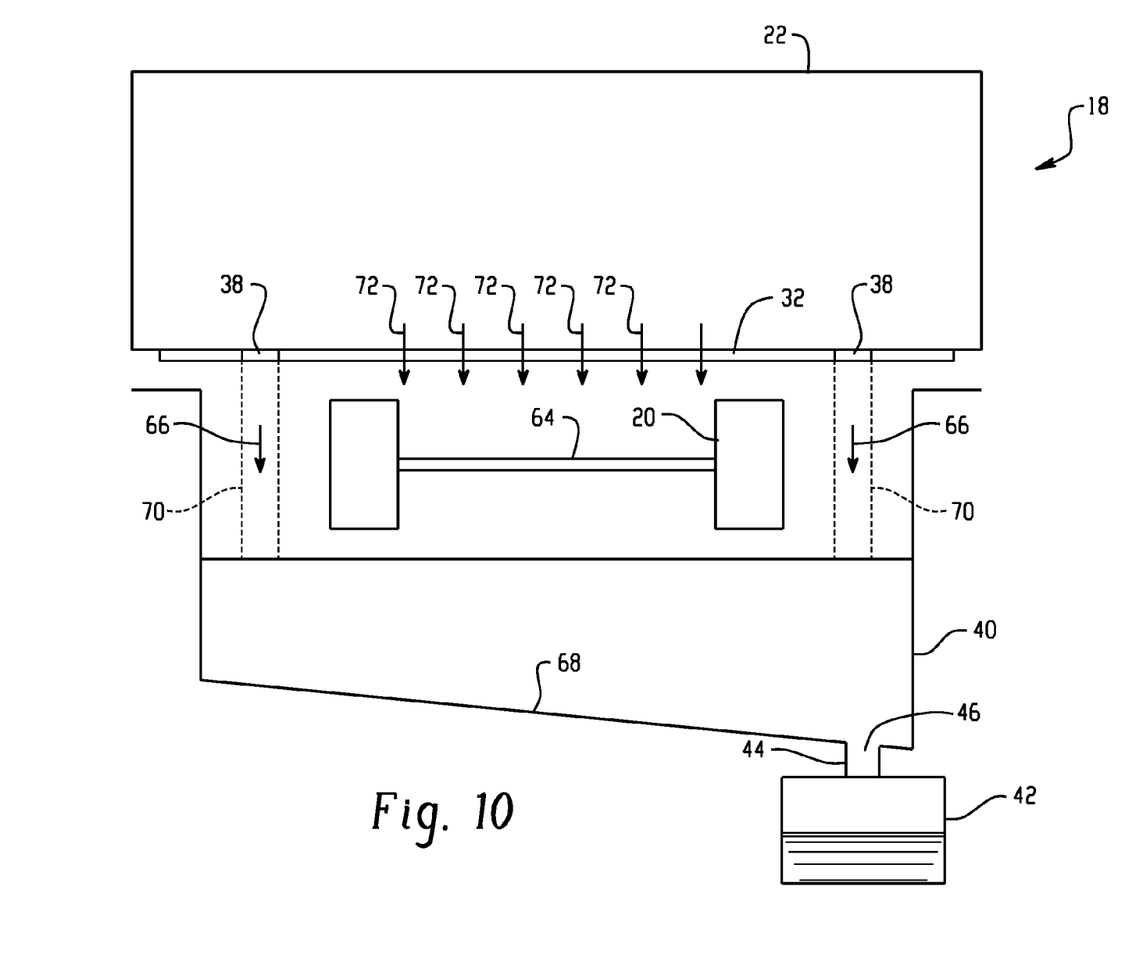

FIGS. 9 and 10 illustrate a method of operating the cooling zone 18 for cooling the PCBs 64 as they are conveyed by the conveyor mechanism 20. Referring first to FIG. 9, air is drawn into the heat exchanger compartment through the air intake 26 by the fan 28. The air may be from an upstream zone of the oven 10 and include flux vapors when it enters the plenum 22. The air is drawn through the heat exchanger 30 which cools the air. The cooled air is then directed into the plenum toward the diffuser plate 32.

Referring to FIG. 10, as the cooled air contacts components in the cooling zone 18 including the diffuser plate 32, flux material condenses and collects on the upper surface 34 of the diffuser plate. As described above, the raised portions 48 surrounding the nozzle openings 36 inhibits the condensed flux from passing through the nozzle openings and down onto the PCBs 64 while directing cooled air streams 72 onto the PCBs. The condensed flux is directed to the drain holes 38 that do not include the raised portions, where the condensed flux is allowed to drain from the diffuser plate 32 as flux drainage 66. As shown, the drain holes 38 are located to the sides of the conveyor mechanism 20. The condensed flux can be directed to the drain holes 38 by any number of ways. In some embodiments, the diffuser plate 32 may be angled or bent slightly downhill toward the drain holes 38. In some embodiments, the air pressure directed onto the upper surface 34 of the diffuser plate 32 causes the condensed flux to move toward the drain holes 38.

The flux drainage 66 then drops into the cooling pan 40. The cooling pan 40 includes an angled bottom surface 68 that is slanted downwardly toward the drain 46. The drain is connected to the drain conduit 44, which is connected to the collection container 42.

It is to be clearly understood that the above description is intended by way of illustration and example only and is not intended to be taken by way of limitation, and that changes and modifications are possible. For example, in some embodiments, drain channels 70 (represented by dotted lines of FIG. 10), for example, in the form of a drain tube may be provided that direct flux drainage 66 from the drain holes 38 to the cooling pan 40. In addition, while the diffuser plate is primarily described as being made of metal and of a unitary configuration, the diffuser plate could be formed of suitable non-metal materials and could also be of multi-part construction. Accordingly, other embodiments are contemplated and modifications and changes could be made without departing from the scope of this application.

What is claimed is:

1. A reflow solder oven, comprising:
   a conveyor mechanism for moving printed circuit boards through at least one heating zone followed by at least one cooling zone, the cooling zone including:
      a gas flow path with a gas intake, a heat exchanger, a plenum and a diffuser, the heat exchanger positioned downstream of the gas intake for cooling gas flowing thereby, the plenum downstream of the heat exchanger for receiving cooled gas from the heat exchanger, the diffuser having an upper surface exposed to the plenum and a plurality of nozzle openings arranged to direct cooled gas from the plenum downward toward printed circuit boards on the conveyor mechanism, each of the plurality of nozzle openings formed by a surrounding wall portion extending upwardly from the upper surface to an upper portion, the upper portion extending radially inwardly to a downwardly extending wall portion, the downwardly extending wall portion ends at the nozzle opening such that the nozzle opening is located below the upper portion, the surrounding wall portion acts to restrict condensed flux on the upper surface of the diffuser from flowing through the nozzle openings toward printed circuit boards, where the surrounding wall portion is separated from the downwardly extending wall portion by an annular air gap, the diffuser being of metal plate construction and the surrounding wall portion, upper portion and downwardly extending wall portion being unitary with the metal plate.

2. The reflow solder oven of claim 1 wherein the nozzle openings are formed by a first stamping operation and the raised surrounding portions are formed by a second stamping operation.

3. The reflow solder oven of claim 1, further including:
   a drain hole located in the diffuser for allowing condensed flux on the upper surface to flow out of the plenum;
   a collection pan located below the conveyor mechanism for receiving condensed flux that flows through the drain hole.

4. The reflow solder oven of claim 3 wherein the diffuser is located such that at least some of the nozzle openings are aligned above and over the conveyor mechanism and the drain hole is located above and to a side of the conveyor mechanism such that condensed flux flowing from the drain hole travels alongside the conveyor mechanism into the collection pan.

5. The reflow solder oven of claim 4 wherein a flow tube extends from the drain hole toward the collection pan.

6. The reflow solder oven of claim 3 wherein the drain hole is a first drain hole and the side is a first side of the conveyor mechanism, the diffuser includes a second drain hole located above and to a second, opposite side of the conveyor mechanism.

* * * * *